United States Patent [19]

Katoh et al.

[11] Patent Number: 5,573,982
[45] Date of Patent: Nov. 12, 1996

[54] SLURRY COMPOSITION, SHAPING METHOD USING THE SAME, AND FIRED BODY

[75] Inventors: Naoyuki Katoh; Kumehiko Sanada; Hiroshi Muto, all of Mie, Japan

[73] Assignees: Mitsubishi Chemical BASF Company Limited; Miyawo Company Ltd., both of Yokkaichi, Japan

[21] Appl. No.: 398,649

[22] Filed: Mar. 3, 1995

[30] Foreign Application Priority Data

Mar. 5, 1994 [JP] Japan ..................... 6-060062
Jul. 29, 1994 [JP] Japan ..................... 6-197742

[51] Int. Cl.$^6$ ..................... C04B 35/00
[52] U.S. Cl. ..................... 501/1; 501/94; 501/141; 501/143; 501/144; 106/486; 106/487; 524/1; 524/80; 524/401; 524/442; 524/445; 524/446; 524/447; 264/63; 264/176.1; 264/299; 264/319; 264/311.11; 264/331.21
[58] Field of Search ..................... 501/1, 94, 141, 501/142, 143, 144; 524/1, 80, 442, 444, 445, 446, 447, 450, 401; 264/63, 176.1, 299, 319, 331.11, 331.21; 106/486, 487, 416

[56] References Cited

U.S. PATENT DOCUMENTS

| | | | |
|---|---|---|---|
| 3,817,897 | 6/1974 | Dill | 524/446 |
| 4,146,525 | 3/1979 | Stradley | 523/466 |
| 4,571,414 | 2/1986 | Renlund et al. | 501/98 |
| 4,902,459 | 2/1990 | Matsubara et al. | 264/63 |
| 4,906,424 | 3/1990 | Hughes et al. | 264/63 |
| 5,087,594 | 2/1992 | Kato et al. | 524/80 |
| 5,132,255 | 7/1992 | Takeuchi et al. | 501/1 |
| 5,248,712 | 9/1993 | Takeuchi et al. | 524/56 |
| 5,292,693 | 3/1994 | Kaga et al. | 501/103 |

FOREIGN PATENT DOCUMENTS

| | | |
|---|---|---|
| 47-8188 | 4/1972 | Japan . |
| 59-199703 | 11/1984 | Japan . |
| 3-64465 | 5/1986 | Japan . |
| 4-32155 | 1/1987 | Japan . |
| 5-104509 | 4/1993 | Japan . |
| 58-8360 | 5/1993 | Japan . |
| 6-24820 | 2/1994 | Japan . |

*Primary Examiner*—Mark L. Bell
*Assistant Examiner*—Michael Marcheschi
*Attorney, Agent, or Firm*—Oblon, Spivak, McClelland, Maier & Neustadt, P.C.

[57] ABSTRACT

A slurry composition is described, which comprises 100 parts by weight of a raw mineral material for white ware and/or a raw mineral material for advanced ceramics, from 0.5 to 20 parts by weight of a re-dispersible resin powder, and water. A shaping using the slurry composition and a fired body are also described.

10 Claims, No Drawings

SLURRY COMPOSITION, SHAPING METHOD USING THE SAME, AND FIRED BODY

FIELD OF THE INVENTION

The present invention relates to a slurry composition, a shaping method using the same, and a fired body.

BACKGROUND OF THE INVENTION

In conventional shaping processes for producing white ware and advanced ceramics, a slurry is first prepared by adding an appropriate amount of water and other ingredients to a desired raw mineral material such as one for white ware or advanced ceramics to impart fluidity to the raw material and grinding and blunging the raw material with, e.g., a ball mill.

The thus-prepared slurry, having a water content of from 15 to 35%, is formed into a shape. Examples of shaping methods include the casting in which the slurry is poured into a water-absorbing mold, e.g., a gypsum mold, to allow it to be casted on the inner surface of the mold as a result of water absorption by the mold, and the resulting cast is separated from the mold; and the plastic shaping in which the slurry is dewatered on a filter press or the like to produce a press cake having a water content of from 10 to 30%, and this cake is pugged by means of a vacuum pugmill to prepare a pug for plastic shaping and then formed into a desired shape (this plastic shaping include extrusion and jiggering).

This green ware is then subjected to steps such as drying, biscuit firing, glazing, firing, and cutting to yield the final product.

In the case of the casting, the casted green ware itself is required not only to have a mechanical strength sufficient to withstand finishing and handling including conveying but also to be easily dewatered. In the case of the plastic shaping, the slurry should be dewatered without any problem, the pug should be free from air bubble inclusion, and the green ware is required to dry quickly and have a mechanical strength sufficient to withstand finishing and handling including conveying.

A technique of incorporating plastic clay, or the like into raw mineral materials in white ware production has hence been conventionally employed for imparting the plasticity necessary for plastic shaping and for also imparting mechanical strength. However, such conventional raw mineral materials are defective in that it is difficult to produce thin-walled large green wares therefrom because of the insufficient strength of the green wares.

In the production of advanced ceramics also, the shaping of green wares having sufficient strength only from raw mineral materials for advanced ceramics has been virtually impossible.

To overcome the above-described problem, a technique of incorporating a water-soluble resin, an aqueous resin emulsion, or the like at the time of slurry preparation or pugging has been added (see JP-B-3-64465, JP-B-4-32155, and JP-A-5-104509). (The terms "JP-B" and "JP-A" as used herein mean an "examined Japanese patent publication" and an "unexamined published Japanese patent application", respectively.)

Although the above prior art technique is effective in enhancing the strength of green wares due to the incorporation of a water-soluble resin or aqueous resin emulsion, it has the following drawbacks.

(i) From the standpoint of mixing, the aqueous resin emulsion or water-soluble resin should be added after the raw mineral material for white ware or advanced ceramics and other ingredients have been slurried. This mixing procedure results in foaming, which tends to reduce the mechanical strength of green wares.

(ii) It is difficult to prepare a homogeneous slurry because the resin ingredient is apt to separate out due to the large difference in density between the aqueous resin emulsion or the like and the raw mineral material for white ware or advanced ceramics. Green wares obtained from such an inhomogeneous slurry tend to suffer warpage or cracking. In particular, homogeneous mixing is difficult in the case of high-viscosity slurries.

(iii) The resin ingredient of the aqueous resin emulsion or the like tends to migrate to the surface of the green ware to cause tackiness. As a result, casted green wares particularly in the form of a wide flat plate or the like have impaired suitability for surface finishing. Moreover, in the forced drying of such green wares, the resin ingredient which has migrated to the green wire surface forms a film upon surface drying to cause delayed internal drying, which tends to result in warpage, cracking, blistering, etc.

(iv) In the casting, the aqueous resin emulsion or water-soluble resin partly penetrates into the mold itself as a result of the dewatering of the slurry which has been poured into the mold, making demolding difficult.

(v) During dewatering in plastic shaping, the water-soluble resin or aqueous resin emulsion partly migrates to the outside of the system along with the water being removed. As a result, the resin ingredient adheres to the filter cloth to cause clogging, dries and solidifies on the filter cloth surface, and causes troubles including adhesion of the filter cake to the filter cloth. Thus, the filtration for concentration becomes impossible.

SUMMARY OF THE INVENTION

The present inventor conducted intensive studies in order to overcome the above-described problems of the prior art techniques. As a result, it has been found that by mixing a re-dispersible resin powder with a raw mineral material and water, a homogeneous stable slurry composition can be prepared and a green ware excellent in mechanical strength, drying characteristics, etc. can be shaped from the composition. The present invention has been achieved based on this finding.

More particularly, the following have been found. The slurry composition, when used in the casting, is also excellent in the casting rate and in demolding. When the slurry composition is used in the plastic shaping, the dewatering operation for concentration on a filter press machine can be carried out highly efficiently. The present invention has been completed based on the above.

According to the first aspect of the present invention, a slurry composition is provided which comprises 100 parts by weight of a raw mineral material for white ware and/or a raw mineral material for advanced ceramics, from 0.5 to 20 parts by weight of a re-dispersible resin powder, and water.

According to the second aspect of the present invention, a method for shaping a green ware by casting is provided which comprises casting a slurry composition comprising 100 parts by weight of a raw mineral material for white ware and/or a raw mineral material for advanced ceramics, from 0.5 to 20 parts by weight of a re-dispersible resin powder, and water.

According to the third aspect of the present invention, a pug for plastic shaping is provided which is produced by dewatering a slurry composition comprising 100 parts by weight of a raw mineral material for white ware and/or a raw mineral material for advanced ceramics, from 0.5 to 20 parts by weight of a re-dispersible resin powder, and water, and then pugging the dewatered composition.

According to the fourth aspect of the present invention, a method for shaping a green ware is provided which comprises shaping a pug produced by dewatering a slurry composition comprising 100 parts by weight of a raw mineral material for white ware and/or a raw mineral material for advanced ceramics, from 0.5 to 20 parts by weight of a re-dispersible resin powder, and water, and then pugging the dewatered composition, into a desired shape.

According to the fifth aspect of the present invention, a fired body is provided which is produced by firing a green ware obtained by a method which comprises casting a slurry composition comprising 100 parts by weight of a raw mineral material for white ware and/or a raw mineral material for advanced ceramics, from 0.5 to 20 parts by weight of a re-dispersible resin powder, and water.

According to the sixth aspect of the present invention, a fired body is provided which is produced by firing a green ware obtained by a method which comprises shaping a pug produced by dewatering a slurry composition comprising 100 parts by weight of a raw mineral material for white ware and/or a raw mineral material for advanced ceramics, from 0.5 to 20 parts by weight of a re-dispersible resin powder, and water, and then pugging the dewatered composition, into a desired shape.

DETAILED DESCRIPTION OF THE INVENTION

The raw mineral material for white ware used in the present invention may be a known raw material for white ware, and examples thereof include feldspars, silica stones, porcelain stones, kaolins, and clays. The raw mineral material for advanced ceramics may be a known raw material, and examples thereof include alumina, zirconia, silica, ferrites, silicon carbide, silicon nitride, and sialon. These raw mineral materials for white ware and advanced ceramics may be used alone or as a suitable mixture according to need. Hereinafter, the necessary raw mineral material for white ware or for advanced ceramics is referred to simply as "raw mineral material."

The re-dispersible resin powder to be used is the so-called re-dispersible resin powder, which is obtained by spray-drying an emulsion of a polyvinyl acetate, a vinyl acetate copolymer (e.g., an ethylene-vinyl acetate copolymer), or an acrylic resin (see, for example, JP-A-47-8188, JP-A-59-199703, JP-A-6-24820, and JP-A-58-83060). This re-dispersible resin powder desirably has a glass transition temperature of −5° C. or higher from the standpoint of appropriate film formation. If the glass transition temperature of the resin is lower than −5° C., the resin tends to coagulate and adhere. On the other hand, too high glass transition temperatures tend to result in insufficient film formation. The preferred range of the glass transition temperature of the resin is hence from 0° to 20° C. In the case of using a re-dispersible resin powder having a relatively high glass transition temperature, it is desirable to employ a higher drying temperature and a longer drying time or to add a plasticizer or a film-forming aid. The amount of the re-dispersible resin powder to be added to the raw mineral material varies depending on the kind of the raw mineral material, the kind of the re-dispersible resin powder, the desired properties of the fired body to be produced, etc. However, the addition amount thereof is generally from 0.5 to 20 parts by weight, preferably from 0.5 to 15 parts by weight, more preferably from 1.0 to 15 parts by weight, based on 100 parts by weight of the raw mineral material. If the addition amount of the re-dispersible resin powder is smaller than 0.5 parts by weight, the resulting slurry gives green wares having insufficient mechanical strength. If the addition amount thereof exceeds 20 parts by weight, the green wares obtained from the resulting slurry, although having sufficient mechanical strength before firing, undergo considerable firing shrinkage to give fired bodies which not only have considerably reduced mechanical strength but also are reduced in the properties inherent in the raw mineral material.

Such too large resin amounts further have the following problems. In casting, demolding is difficult. In plastic shaping, the press cake which has been dewatered by the method described later has impaired separability from the filter cloth.

Re-dispersible resin powders are commercially available under the trade names of, e.g., Sumikaflex (registered trademark) RP-100S and RP-110, manufactured by Sumitomo Chemical Co., Ltd., Japan; Acronal (registered trademark) DS-6029 and DS-6031, manufactured by Mitsubishi Chemical BASF Company Limited, Japan; and Mowinyl (registered trademark) DM200, DM289, 843, SA, and E45, manufactured by Hoechst Gosei K.K., Japan.

The water serving as a dispersion medium is preferably added in such an amount that the water content of the slurry is from about 15 to about 35% by weight for casting and from about 40 to about 70% by weight for plastic shaping. Besides the water, various additive ingredients may be added if desired and necessary. Examples of additive ingredients include inorganic deflocculants such as caustic soda, sodium silicate, water glass, and phosphoric ester, organic deflocculants such as diethylamine, di-n-propylamine, pyridine, and polyacrylic acid salts, protective colloids such as fumic acid, tannic acid, and lignin, grinding aids such as stearic acid, oleic acid, and naphthenic acids, and other additives including dispersants, wetting agents, water-reducing agents, fluidizing agents, high-performance fluidizing agents, and emulsifiers.

A necessary amount of a re-dispersible resin powder is added to a raw mineral material and this mixture is ground with a known mill, e.g., a ball mill or tube mill, while water and optional ingredients such as a deflocculant are added thereto, to prepare a slurry in which the particle diameters of the raw mineral material are from 0.1 to 10 μm. Since the re-dispersible resin powder is powdery, it not only causes little foaming as compared with conventional aqueous resin emulsions, but also suffers neither separation nor re-coagulation based on a density difference between the resin and the raw mineral material. As a result, the resin powder is evenly dispersed exceedingly stably, so that a slurry having an appropriate viscosity can be prepared advantageously. Therefore, in the slurry prepared, the re-dispersible resin powder is always present stably in an evenly dispersed state. Although the re-dispersible resin powder may be mixed with a slurry prepared beforehand from a raw mineral material and water, the powder shows poor dispersibility into the slurry and much time is necessary for dispersing the powder. It is therefore preferred to slurry the raw mineral material and the re-dispersible resin powder simultaneously. The slurry prepared can be stored as it is, because the re-dispersible resin powder is stably present therein in an evenly dispersed state.

The prepared slurry can be shaped by various methods. For example, the slurry is poured into a mold such as a gypsum mold to allow it to be casted on the inner surface of the mold as a result of water absorption by the mold, and the cast is then demolded to shape a casted green ware (casting). Since the slurry of the present invention contains the re-dispersible resin powder which is exceedingly stably present therein in an evenly dispersed state, not only the casted green ware necessarily has enhanced mechanical strength, but also the casting rate on the mold is appropriate. In addition, demolding is easy and extremely smooth. This effect is pronounced when the casted green ware has a small wall thickness. Not only casted green wares of conventional forms but also casted green wares which are thin, lightweight, and large can be easily shaped from the slurry.

The casted green ware separated from the mold is suitably dried, and then fired in a known manner to produce a fired body. During the drying and firing treatments, the casted green ware is free from the fear of warpage or cracking because it has been shaped from the slurry containing the re-dispersible resin powder stably present therein in an evenly dispersed state.

In another shaping method, the slurry is dewatered and concentrated with a pressure filter, e.g., a filter press, to give a press cake having a water content of from 10 to 30% by weight, preferably from 15 to 25% by weight. In this step, the slurry is dewatered through a filter cloth. Since the re-dispersible resin powder is extremely stably present in the slurry in an evenly dispersed state, water only is removed through the filter cloth without causing filter clogging, coagulation and adhesion, film formation, etc. As a result, the filtration can be carried out extremely easily and, at the same time, the press cake can be easily separated from the filter cloth without adhesion thereto.

The press cake obtained is pugged by means of a known pugmill to prepare a pug. This pug is then formed into a desired shape by plastic shaping such as extrusion or jiggering. The green ware obtained by plastic shaping is suitably dried preferably at a temperature of 20° C. or higher. In the present invention, since the re-dispersible resin powder contained in the press cake is stably present in an evenly dispersed state, the green ware not only is free from the fear of blistering, delamination, cracking, etc. during drying and firing, but also can have a reduced wall thickness because of the high strength thereof before firing. The pug for plastic shaping according to the present invention, which is prepared by dewatering and concentrating the slurry prepared through the optimum grinding and blunging operation, can be converted to a slurry for plastic shaping by adding water, a dispersant, etc. thereto again, and this slurry may be used.

The green ware obtained by plastic shaping is dried suitably and then fired in a known manner to provide a fired body.

The present invention will be explained below in more detail by reference to the following Examples, but the invention should not be construed as being limited thereto.

EXAMPLES 1 TO 6 AND COMPARATIVE EXAMPLES 1 TO 5

According to the formulations shown in Table 1 below, a re-dispersible resin powder or an aqueous resin emulsion (the amounts thereof are given on a dry basis) was added to a raw mineral material, and this mixture was ground and blunged with a ball mill while water was added thereto along with sodium silicate. Thus, slurries were prepared.

Each slurry prepared was poured into a gypsum mold having a length of 500 mm, a width of 500 mm, and a depth of 2 mm and into one having the same length and width dimensions and a depth of 5 mm, and was then allowed to stand for 1 hour to shape casted green wares. The green wares were demolded and dried first at room temperature for 24 hours and then at 110° C. for 24 hours. The green wares were evaluated for warpage and cracking during the above step, based on the following criteria. The results obtained are shown in Table 2 below.

Mold Releasability

A: easily demoldable.

B: demoldable, with slight adhesion to the mold.

C: poorly demoldable, with considerable adhesion to the mold and occurrence of cracking, etc.

Warpage, Cracking a: Samples with no or almost no warpage and cracking.

b: Samples with warpage or cracking.

Each of the slurries prepared above was poured into a gypsum mold having a length of 110 mm, a width of 15 mm, and a depth of 6 mm, and was then allowed to stand for 1 hour. Each resulting cast was demolded to obtain a casted green ware, which was dried first at 20° C. for 24 hours and then at 110° C. for 24 hours. Subsequently, the casted green wares were gradually heated to 1,230° C. over a period of 5 hours and kept at that temperature for 1 hour, and then cooled over a period of 4 hours to obtain fired bodies. The bending strength of each sample were measured by the following method after the drying at 20° C., after the drying at 110° C., and after the firing at 1230° C. The degree of firing shrinkage and the water absorption of each sample were also measured by the following methods. The results obtained are shown in Table 2 below.

Bending Strength: Bending strength was measured in accordance with JIS R1601-81.

$$\text{Degree of Shrinkage (\%):} \quad \frac{110 \text{ mm} - (\text{length (mm) after firing})}{110 \text{ mm}} \times 100$$

$$\text{Water Absorption (\%):} = \frac{(\text{Weight after 3-hour immersion in 80° C. water}) - (\text{Weight after drying})}{(\text{Weight after drying})} \times 100$$

The weight after 3-hour immersion in 80° C. water is measured after the sample is taken out of the water and wiped to remove the surface water. The weight after drying is measured after the sample is dried at 110° C. for 24 hours and then allowed to stand at 20° C. and 65% RH for 24 hours.

EXAMPLE 7 AND COMPARATIVE EXAMPLES 6 AND 7

The same procedures as in Examples given above were carried out, except that the temperature for firing casted green ware was changed from 1,230° C. to 1,350° C. The same evaluations as in Examples given above were conducted. The results obtained are shown in Table 2 below.

TABLE 1

|  | Preparation Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Raw Mineral Material | | | | | | | | | | | |
| Raw mineral material for white ware*[1] (parts by weight) | 50 | 50 | 50 | 50 | 50 | — | 50 | 50 | 50 | — | — |
| Raw mineral material for advanced ceramics*[2] (parts by weight) | 50 | 50 | 50 | 50 | 50 | 100 | 50 | 50 | 50 | 100 | 100 |
| Resin | | | | | | | | | | | |
| Kind | A*[3] | A | A | A | B*[4] | A | — | C*[5] | A | D*[6] | — |
| Amount (parts by weight) | 0.5 | 1.0 | 5.0 | 20.0 | 5.0 | 5.0 | — | 5.0 | 25.0 | 2.0 | — |
| Water | 37 | 37 | 39 | 45 | 39 | 32 | 37 | 37 | 47 | 32 | 32 |
| Deflocculants | | | | | | | | | | | |
| A*[7] (parts by weight) | 0.2 | 0.2 | 0.2 | 0.2 | 0.2 | — | 0.2 | 0.2 | 0.2 | — | — |
| B*[8] (parts by weight) | — | — | — | — | — | 1.0 | — | — | — | 1.0 | 1.0 |
| Anti-foaming agent*[9] (parts by weight) | — | — | — | — | — | — | — | — | — | 0.1 | — |

*[1]"High-class china body" (plastic mineral content, 20%) manufactured by Miyawo Company Limited, Japan.
*[2]"Alumina AMS-9" manufactured by Sumitomo Chemical Co., Ltd.
*[3]Re-dispersible acrylic resin powder "Acronal DS-6031" (glass transition point, 10° C.) manufactured by Mitsubishi Chemical BASF Company Limited, Japan.
*[4]Re-dispersible polyvinyl acetate resin powder "Sumikaflex RP-100S" (glass transition point, 0° C.) manufactured by Sumitomo Chemical Co., Ltd.
*[5]Aqueous acrylic resin emulsion "Acronal YJ-3042D" (glass transition point, 2° C.) manufactured by Mitsubishi Chemical BASF Company Limited.
*[6]Aqueous paraffin resin emulsion "Maxcelon A" (glass transition point, 5° C.) manufactured by Chukyo Yushi Co., Ltd., Japan.
*[7]Sodium silicate
*[8]"Celuna-D-305" manufactured by Chukyo Yushi Co., Ltd.
*[9]"Nopco NXZ" manufactured by San Nopco Ltd., Japan.

TABLE 2

|  | Example | | | | | | Comparative Example | | | | | Example | Comparative Example | |
|---|---|---|---|---|---|---|---|---|---|---|---|---|---|---|
|  | 1 | 2 | 3 | 4 | 5 | 6 | 1 | 2 | 3 | 4 | 5 | 7 | 6 | 7 |
| Preparation Example No. | 1 | 2 | 3 | 4 | 5 | 6 | 7 | 8 | 9 | 10 | 11 | 6 | 10 | 11 |
| Mold Releasability | | | | | | | | | | | | | | |
| Thickness, 2 mm | A | A | A | B | A | A | C | C | C | C | C | A | C | C |
| Thickness, 5 mm | A | A | A | B | A | A | A | C | C | B | C | A | B | C |
| Warpage, Cracking | | | | | | | | | | | | | | |
| Thickness, 2 mm | a | a | a | a | a | a | a | b | a | a | a | a | a | a |
| Thickness, 5 mm | a | a | a | a | a | a | a | b | a | a | a | a | a | a |
| Bending Strength (kgf/cm²) | | | | | | | | | | | | | | |
| After 20° C. drying | 30.1 | 40.2 | 77.3 | 95.6 | 64.5 | 30.5 | 23.9 | 33.5 | 109.9 | 20.8 | 6.0 | 30.5 | 20.8 | 6.0 |
| After 110° C. drying | 34.2 | 45.7 | 91.1 | 121.5 | 72.5 | 35.2 | 25.7 | unable to be measured due to cracking | 141.2 | 23.8 | 8.0 | 35.2 | 23.8 | 8.0 |
| After firing | 919 | 973 | 919 | 853 | 903 | 107 | 898 | unable to be measured due to cracking | 710 | 125 | 101 | 2250 | 2100 | 2200 |
| Degree of Shrinkage (%) | 6.9 | 7.1 | 7.7 | 8.8 | 8.4 | 1.1 | 7.5 | — | 10.2 | 1.2 | 1.0 | 17.6 | 17.4 | 16.9 |
| Water Absorption (%) | 6.3 | 6.2 | 6.2 | 7.3 | 6.6 | 19.3 | 5.7 | — | 8.3 | 18.2 | 20.1 | 0 | 0 | 0 |

EXAMPLES 8 TO 13 AND COMPARATIVE EXAMPLES 8 TO 13

According to the formulations shown in Table 3 below, a re-dispersible resin powder, a water-soluble resin, or an aqueous resin emulsion (the amounts thereof are given on a dry basis) was added to a raw mineral material along with water, and this mixture was ground and blunged with a ball mill. Thus, slurries having a water content of about 60% were prepared.

Each of these slurries was dewatered with filter press M14-S, manufactured by Makino Corporation, Japan by elevating the pressing pressure to 14 kg/cm², maintaining this pressure for 30 minutes, and then lowering the pressure, to thereby obtain a press cake. The aptitude of the slurry in the dewatering step was evaluated after repeating this procedure twenty times at the most. The results obtained are shown in Table 4 below. The resulting press cakes of each sample were pugged with vacuum pugmill SY-11, manufactured by Ishikawatoki Tekkosyo Co., Ltd., Japan, to prepare a pug for plastic shaping which had a hardness of 11 as measured with an NGK clay hardness tester. Each pug was then subjected to extrusion and jiggering by the following methods.

Extrusion: Extrusion was performed using the aforementioned vacuum pugmill to form a continuous extrudate whose section had a height of 10 mm and a width of 30 mm, which extrudate was cut into a length of 50 mm.

Jiggering: Green wares having a height of 50 mm, a width of 30 mm, and a wall thickness of 10 mm were obtained using a jigger.

Each of the green wares obtained by the above two methods was air-dried at 20° C. for 24 hours and then further dried at 110° C. for 24 hours. The dried green wares were fired to 1,230° C. over a period of 5 hours, kept at that temperature for 1 hour, and then cooled over a period of 4 hours to obtain fired bodies. The bending strength of each sample was measured after the drying at 20° C., after the drying at 110° C., and after the firing. The degree of firing shrinkage and the water absorption of each sample were also measured. The results obtained are shown in Table 4 below. The measurements of bending strength and degree of shrinkage were made not by the above-described methods but by the following ones. The measurement of water absorption was made in the same manner as the above.

Bending Strength: Bending strength was measured by the three-point bending test method.

$$\text{Bending strength (kg/cm}^2\text{)} = \frac{3PL}{2bh^2}$$

$P$: load (kgf)

$L$: span (cm)

$b$: test piece width (cm)

$h$: test piece thickness (cm)

Degree of Shrinkage:

$$\text{Degree of shrinkage (\%)} = \frac{50 \text{ mm} - \text{(length (mm) after firing)}}{50 \text{ mm}} \times 100$$

Water Absorption:

$$\text{Water absorption (\%)} = \frac{\text{(Weight after 3-hour immersion in 80° C. water)}^* - \text{(Weight after drying)}^{}}{\text{(Weight after drying)}^{}} \times 100$$

*: taking the sample out of water and wiping off the surface water.

**: weight measured after drying at 110° C. for 24 hours and subsequent standing at 20° C., 65% RH for 24 hours.

TABLE 3

| | Preparation Examples | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Raw Mineral Material | | | | | | | | | | | | |
| Raw mineral material for white ware*[1] (parts by weight) | 50 | 50 | 50 | 50 | 50 | 5 | 50 | 50 | 50 | 5 | 50 | 50 |
| Raw mineral material for advanced ceramics*[2] (parts by weight) | 50 | 50 | 50 | 50 | 50 | 95 | 50 | 50 | 50 | 95 | 50 | 50 |
| Resin | | | | | | | | | | | | |
| Kind | A*[3] | A | A | A | B*[4] | A | — | C*[5] | D*[7] | E*[6] | A | A |
| Amount (parts by weight) | 0.5 | 1.0 | 5.0 | 20.0 | 1.0 | 10.0 | — | 4.0 | 0.5 | 10.0 | 0.2 | 25.0 |
| Water | 150 | 150 | 160 | 180 | 150 | 170 | 150 | 150 | 150 | 170 | 150 | 190 |
| Foaming during ball milling | no | no | no | slight | no | no | no | considerable | no | considerable | no | slight |

*[1]"High-class china body" (plastic mineral content, 20%) manufactured by Miyawo Company Limited.
*[2]"Alumina AMS-9" manufactured by Sumitomo Chemical Co., Ltd.
*[3]Re-dispersible acrylic resin powder "Acronal DS-6031" (glass transition point, 10° C.) manufactured by Mitsubishi Chemical BASF Company Limited.
*[4]Re-dispersible polyvinyl acetate resin powder "Sumikaflex RP-100S" (glass transition point, 0° C.) manufactured by Sumitomo Chemical Co., Ltd.
*[5]Aqueous acrylic resin emulsion "Acronal YJ-3042D" (glass transition point, 2° C.) manufactured by Mitsubishi Chemical BASF Company Limited.
*[6]Aqueous paraffin resin emulsion "Maxcelon A" (glass transition point, 5° C.) manufactured by Chukyo Yushi Co., Ltd.
*[7]Water-soluble CMC resin "Celogen WS-C" manufactured by Dai-ichi Kogyo Seiyaku Co., Ltd., Japan.

TABLE 4

| | Example | | | | | |
|---|---|---|---|---|---|---|
| | 8 | 9 | 10 | 11 | 12 | 13 |
| Preparation Example No. | 12 | 13 | 14 | 15 | 16 | 17 |
| Extrusion | | | | | | |
| Bending Strength (kgf/cm$^2$) | | | | | | |
| After 20° C. drying | 19.2 | 23.1 | 38.7 | 79.1 | 18.7 | 36.9 |
| After 110° C. drying | 25.9 | 31.8 | 50.0 | 92.4 | 25.1 | 46.2 |
| After firing | 801.0 | 787.0 | 777.0 | 754.0 | 792.0 | — |
| Degree of Shrinkage (%) | 7.8 | 7.8 | 8.1 | 8.5 | 7.9 | — |
| Water Absorption (%) | 7.9 | 8.1 | 8.5 | 9.4 | 8.1 | — |
| Jiggering | | | | | | |
| Bending Strength (kgf/cm$^2$) | | | | | | |
| After 20° C. drying | 17.9 | 20.6 | 36.8 | 71.0 | 16.9 | 32.1 |
| After 110° C. drying | 21.6 | 28.7 | 46.2 | 88.0 | 21.0 | 41.8 |
| After firing | 773.0 | 756.0 | 738.0 | 719.0 | 767.0 | — |
| Degree of Shrinkage (%) | 7.5 | 7.6 | 7.9 | 8.3 | 7.5 | — |
| Water Absorption (%) | 8.5 | 8.5 | 8.7 | 9.8 | 8.4 | — |
| Dewatering Step | | | | | | |
| Suitability for successive 20-time dewatering | good | good | good | fair | good | good |
| Filter clogging | none | none | none | slight | none | none |
| Filter cleaning | easy | easy | easy | easy | easy | easy |
| Water content of press cake | 22.9 | 23.0 | 23.1 | 23.5 | 23.0 | 15.3 |

| | Comparative Example | | | | | |
|---|---|---|---|---|---|---|
| | 8 | 9 | 10 | 11 | 12 | 13 |
| Preparation Example No. | 18 | 19 | 20 | 21 | 22 | 23 |
| Extrusion | | | | | | |
| Bending Strength (kgf/cm$^2$) | | | | | | |
| After 20° C. drying | 12.6 | — | 13.5 | — | 14.2 | 82.7 |
| After 110° C. drying | 15.1 | — | 16.4 | — | 17.7 | 96.1 |
| After firing | 808.0 | — | 763.0 | — | 807.0 | 711.0 |
| Degree of Shrinkage (%) | 7.8 | — | 8.2 | — | 7.8 | 9.0 |
| Water Absorption (%) | 7.8 | — | 8.6 | — | 7.9 | 10.2 |
| Jiggering | | | | | | |
| Bending Strength (kgf/cm$^2$) | | | | | | |
| After 20° C. drying | 12.2 | — | 12.8 | — | 13.8 | 76.0 |
| After 110° C. drying | 12.9 | — | 14.1 | — | 17.5 | 91.7 |
| After firing | 769.0 | — | 731.0 | — | 771.0 | 682.0 |
| Degree of Shrinkage (%) | 7.5 | — | 8.2 | — | 7.5 | 8.5 |
| Water Absorption (%) | 8.3 | — | 9.2 | — | 8.4 | 10.7 |
| Dewatering Step | | | | | | |
| Suitability for successive 20-time dewatering | good | bad | bad | bad | good | fair |
| Filter clogging | none | clogging | clogging | clogging | none | slight |
| Filter cleaning | difficult | difficult | slightly difficult | difficult | easy | slightly difficult |
| Water content of press cake | 22.9 | — | 24.2 | — | 22.9 | 23.7 |
| Remarks | | *1 | *2 | *3 | | |

Note:
*1: Considerable clogging, with resin solidification. Continuous use was impossible.
*2: Dewatering was possible, but the filter clogged soon. It became usalble upon washing with water.
*3: Considerable clogging, with resin solidification. Continuous use was impossible.

As described above, according to the present invention, since a re-dispersible resin powder is mixed with a raw mineral material, a slurry composition can be prepared in which the re-dispersible resin powder is present extremely stably in an evenly dispersed state. Moreover, green wares having exceedingly high mechanical strength and other excellent properties can be shaped from the slurry composition because the slurry contains the re-dispersible resin powder stably present therein in an evenly dispersed state.

Since green wares having greatly improved mechanical strength can be thus shaped, it is possible to produce fired bodies which are thinner-walled, more lightweight, and larger than conventional products.

In casting, the slurry composition is excellent in the casting rate and also in demolding. In plastic shaping, the separability of the press cake from the filter cloth after dewatering can be maintained over long.

While the invention has been described in detail and with reference to specific embodiments thereof, it will be apparent to one skilled in the art that various changes and modifications can be made therein without departing from the spirit and scope thereof.

What is claimed is:

1. A slurry composition consisting essentially of 100 parts by weight of a raw mineral material comprising raw mineral material for white ware, raw mineral material for advanced ceramics, or mixtures thereof; from 0.5 to 20 parts by weight of a re-dispersible resin powder obtained by spray-drying an emulsion of a polyvinyl acetate, a vinyl acetate copolymer or an acrylic resin; and water.

2. The slurry composition as claimed in claim 1, where the parts by weight of re-dispersible resin powder is from 0.5 to 15 parts by weight.

3. The slurry composition as claimed in claim 1, wherein the re-dispersible resin powder is an acrylic resin or a vinyl acetate copolymer resin.

4. The slurry composition as claimed in claim 1, wherein the re-dispersible resin powder has a glass transition temperature of −5° C. or higher.

5. The slurry composition as claimed in claim 4, wherein the re-dispersible resin powder has a glass transition temperature of from 0° to 20° C.

6. A method for shaping a green ware which comprises casting into a shape a slurry composition consisting essentially of 100 parts by weight of a raw mineral material comprising raw mineral material for white ware, raw mineral material for advanced ceramics, or mixtures thereof; from 0.5 to 20 parts by weight of a re-dispersible resin powder obtained by spray-drying an emulsion of a polyvinyl acetate, a vinyl acetate copolymer or an acrylic resin; and water.

7. A pug for plastic shaping produced by dewatering a slurry composition consisting essentially of 100 parts by weight of a raw mineral material comprising raw mineral material for white ware, raw mineral material for advanced ceramics, or mixtures thereof; from 0.5 to 20 parts by weight of a re-dispersible resin powder obtained by spray-drying an emulsion of a polyvinyl acetate, a vinyl acetate copolymer or an acrylic resin; and water, and then pugging the dewatered composition.

8. A method for shaping a green ware which comprises shaping a pug produced by dewatering a slurry composition consisting essentially of 100 parts by weight of a raw mineral material comprising raw mineral material for white ware, raw mineral material for advanced ceramics, or mixtures thereof; from 0.5 to 20 parts by weight of a re-dispersible resin powder obtained by spray-drying an emulsion of a polyvinyl acetate, a vinyl acetate copolymer or an acrylic resin; and water, and then pugging the dewatered composition into a shape.

9. A fired body produced by firing a green ware obtained by a method which comprises casting a slurry composition consisting essentially of 100 parts by weight of a raw mineral material comprising raw mineral material for white ware, raw mineral material for advanced ceramics, or mixtures thereof; from 0.5 to 20 parts by weight of a re-dispersible resin powder obtained by spray-drying an emulsion of a polyvinyl acetate, a vinyl acetate copolymer or an acrylic resin; and water.

10. A fired body produced by firing a green ware obtained by a method which comprises shaping a pug produced by dewatering a slurry composition consisting essentially of 100 parts by weight of a raw mineral material comprising raw mineral material for white ware, raw mineral material for advanced ceramics, or mixtures thereof; from 0.5 to 20 parts by weight of a re-dispersible resin powder obtained by spray-drying an emulsion of a polyvinyl acetate, a vinyl acetate copolymer or an acrylic resin; and water, and then pugging the dewatered composition into a shape.

* * * * *